3,145,073
TREATMENT OF POLYOLEFIN ARTICLES AND RESULTING PRODUCTS

Domenick Donald Gagliardi, 185 Howland St., East Greenwich, R.I.
No Drawing. Filed Apr. 18, 1962, Ser. No. 188,568
14 Claims. (Cl. 8—100)

This invention relates to the treatment of polyolefin articles and to the resulting products. More particularly, it concerns modification of preformed fibers, films and other shaped articles of solid polymers of olefins to improve surface characteristics including improved dye receptivity, reduced static electricity propensities and greater adhesion to coatings.

High molecular weight polymers of ethylene, propylene and other olefins have been developed which possess a wide range of desirable properties and other attractive features, including low cost. These high molecular weight polymers have become of great commercial importance because of their low cost and many attractive properties. The low-cost, high-strength plastics are being molded, extruded or otherwise fabricated into thousands of different types of household and industrial articles, and they have generated many new industries for the fabrication and utilization of plastics.

Fibers and films constitute a major use of the high molecular weight polyolefins. Fibers constitute a contemplated enormous outlet for the polyolefins which are expected to find ever increasing use in the production of carpets or other floor coverings, yarns and fabrics for wearing apparel, furniture and seat covering and every other use for textile fibers and fabrics which employ large quantities of filaments or yarns.

The widespread use of polyolefins and contemplated further expansion thereof is due to certain inherent attractive properties of the polymers, including high-strength, resistance to attack by insects, mildew or molds and high resistance to corrosion or attack by cleaning agents, light or other chemical or physical agents. However, these inherent properties of the polyolefins also present some problems. Thus, the high degree of chemical inertness of the polymers, although a distinct advantage from some viewpoints, is a disadvantage with respect to the coloring or coating of the polymers. Since the polymers are so inert to most chemical agents, shaped articles made therefrom cannot be dyed, colored or coated satisfactorily using conventional dyeing and coating materials and techniques. As a result, a tremendous amount of research and development work has been devoted to attempts to surmount the coloring and coating problems associated with the high molecular weight polyolefins. To date, the difficulties of dyeing and coloring the polymers have materially restricted their use and will continue to restrict the commercial markets and fields of applications of the polyolefins until satisfactory methods of coloring and coating these materials are developed.

Another inherent disadvantage of solid polymers of olefins is their tendency to acquire static electrical charges. Such static propensities are particularly troublesome in the use of the polyolefins for films and fabrics. This disadvantage is particularly pronounced with carpeting made of olefin fibers and results in the annoying "sparking" which can occur from walking across a floor covering made from yarns of olefin fibers. The static problem can be mitigated to some extent by applying various anti-static agents to the fibers or fabrics made thereof, but such treatments are not durable to many cleaning operations.

A principal object of this invention is the provision of new processes for treatment of preformed articles of solid olefin polymers in order to improve the surface characteristics thereof. Further objects include:

(1) The provision of new processes for improving the dye receptivity of fibers, yarns, fabrics, films and other shaped solid articles of solid olefin polymers.

(2) The provision of new processes for reducing the static electricity propensities of preformed articles of solid polyolefins.

(3) The provision of new processes for modifying the surfaces of preformed articles of solid polyolefins so as to obtain greater adhesion between such surfaces and coatings that are applied to the surfaces.

(4) The provision of new processes for rendering fibers, films or other preformed articles of solid polymers of olefins which are normally substantially incapable of being satisfactorily dyed, capable of being dyed in level, deep shades with conventional cationic dyes using conventional dyeing methods.

(5) The provision of new methods for dyeing or otherwise coloring preformed articles of solid polyolefins that may be carried out in equipment conventionally available and which can be used in conjunction with conventional, commercially available cationic dyestuffs for comparable coloring materials and established dyeing or coloring procedures.

(6) The provision of new, improved forms of preformed articles of solid polyolefins possessing improved surface characteristics as compared with prior known related articles of the solid polymers.

(7) The provision of new and improved fibers, yarns, fabrics, films and other shaped solid articles of solid polymers of olefins having improved dye receptivity, reduced static electricity propensities and greater adhesion to resinous or other coatings applied to the surfaces of the preformed articles.

(8) The provision of new procedures for increasing the adhesion of laminated resins to polyolefin films, fabrics or other polyolefin articles.

(9) The provision of new methods for increasing the ability of polyolefins to retain water-repellent agents, pigments and other coating or finishing materials which may be applied to the surfaces of the polyolefin articles.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished according to the present invention by the treatment of preformed articles of solid olefin polymers with an organic phosphoric acid, particularly the organic phosphoric acids having the following structural formula:

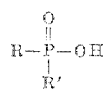

wherein R is an alkyl, aryl, alkoxy or aryloxy radical, especially such radicals containing 2 to 20 carbon atoms, and R' is a hydroxy radical or an alkyl, aryl, alkyloxy or aryloxy radical, especially such organic radicals containing 2 to 20 carbon atoms.

Treatment of the preformed polyolefin article with the organic phosphoric acid is carried out so as to cause a small amount of the organic phosphoric acid to become permanently associated with the surface of the polyolefin article. Such treatment can be attained in various ways, but preferably this is accomplished by contacting the surface of the polyolefin article with the organic phosphoric acid, and then, while the article is in contact with the acid, heating at least the surface of the article to an elevated temperature for a time sufficient for at least some of the organic phosphoric acid to become permanently associated with the article surface. Following such treatment, any excess of the organic phosphoric acid which has not become permanently associated with the polyolefin article is removed such as by scouring the article, leaving the article with improved dye receptivity and other surface characteristics, but otherwise unchanged in visible appearance, strength characteristics or other desirable properties.

The contacting of the polyolefin fibers, films or other preformed solid articles with the organic phosphoric acid may be accomplished while the phosphoric acid is in the vapor or liquid form including solutions in organic solvents, aqueous dispersions or emulsions, as a component of a molten bath, or from solubilizing systems using salts of the free acid or other compounds which yield the free acids under the conditions of treatment. The application of the organic acid can be by impregnation, spraying, coating, contact with vapor or liquid bath, or any other suitable fashion. Following such contact of the reagent with the polyolefin article, the structure is heated to an elevated temperature of about 100° C. or higher, but at least about 10° C. below the melting point of the polyolefin. The times of heating will vary inversely with the temperature so that the heat treatment may be effected in a few minutes at high temperatures up to several hours at low temperatures.

According to a preferred embodiment, a two-step procedure for coloring preformed articles of olefin polymers involves first treatment of the article with organic phosphoric acid followed by dyeing or other coloring or coating of the surface of the article. In the case of textile materials, the modified, treated fabric may be colored by padding through a bath of basic dyestuff followed by drying of the colored material. Alternatively, the modified textile material may be printed with dye-printing systems utilizing conventional techniques.

The basic treatment as outlined above may be modified with preliminary, simultaneous or subsequent auxiliary processes and agents including wetting agents, leveling agents, thickening agents, anti-crocking agents, emulsifiers, water-repellents, oil-repellents and the like. Depending on the concentration of organic phosphoric acid employed, which will be used broadly in amounts of 0.1 to 100% by weight of the polyolefin being treated, the preformed modified article may be used directly for subsequent coating, dyeing or other surface treatment or may be scoured or otherwise processed to remove excess of the organic phosphoric acid.

The success of the present invention is due in part to the discovery that the treating agent used for modification of the surface of the preformed polyolefin article produces a permanent improvement in the surface characteristics of the article that is permanent. In other words, the change in the article surface creating improved dye receptivity, reduction in static electricity propensities, etc., is not removed by washing, scouring, dry-cleaning, or other normal handling or processing operations to which fibers, films or other preformed articles of polyolefins would be subjected. On the other hand, these treatment procedures do not visibly effect the preformed articles nor detract from the strength or other desirable properties of the articles. Whether partial or complete penetration of the treating reagent into the fibers, films or other articles takes place is presently not known. In any event, the results of the treating procedures contrasts greatly with known behavior of surface coating where the color or other effect obtained by the coating is easily removed by rubbing, by wear or by washing and dry-cleaning processes.

The following list is exemplary of organic phrosphoric acids which may be used in treating polyolefin articles in accordance with the invention. Mixtures of two or more organic phosphoric acids may be used in the procedures of a plurality of such reagents may be applied in separate treating steps.

Propyl phosphoric acid
Butyl phosphoric acid
Diamyl phosphoric acid
Octadecyl phosphoric acid
Glycerol phosphoric acid
Di-2-ethylhexyl phosphoric acid
Phenyl phosphoric acid
Methyl phenyl phosphoric acid
Dioctyl acid phosphate
Propyl diacid phosphate
Benzyl diacid phosphate
Butyl lauryl acid phosphate
Benzyl phenyl phosphoric acid
Cyclohexyl phosphoric acid
Naphthyl phosphoric acid
p-Hexylphenyl methyl phosphoric acid
2-phenylethyl octadecyl acid phosphate A further understanding of the new procedures and resulting products of this invention may be had by reference to the following specific examples of actual operations in accordance with the invention. In these examples and throughout the remainder of the specification and claims, all parts or percentages are by weight unless otherwise specified.

*Example 1*

A film of polypropylene was passed through a solution containing 5 parts of butyl phosphoric acid and 95 parts of isopropanol. It was then air dried and heated at 105° C. for 15 minutes. After heating, the film was scoured in a water solution containing 0.1% non-ionic detergent and 0.5% sodium carbonate, rinsed and dried. The piece of treated polypropylene film and a piece of the original film similarly treated with isopropanol alone were dyed together in a dye bath containing 1% of the textile dye, Crystal Violet, based on film weight, and at a 30:1 bath ratio of solution to film weight. The dye bath was raised from 27° C. to 95° C. in one hour, held at 95° C. for another hour, then discarded. The dyed films were scoured in a bath containing 0.1% non-ionic detergent and 0.5% sodium carbonate at 60° C., rinsed several times and dried. Examination of the two films showed that the one pretreated with the butyl phosphoric acid solution was colored a very deep violet color, was optically clear, and produced no static charge on rubbing. The isopropanol treated film was essentially non-colored and only a very faint hue could be observed on close examination. This film readily acquired a charge of static electricity on rubbing.

*Example 2*

A solution containing 5 parts of butyl acid phosphate dissolved in 95 parts of isopropanol was prepared. Using a conventional padding procedure, the solution was applied to samples of white cloth woven from continuous filaments of polypropylene and also other samples woven from spun yarns of polypropylene fibers. After padding, the wetted specimens were dried for 15 minutes at 105° C. followed by further heating for 5 minutes at 120° C. The cloth specimens were then scoured with a cleaning solution containing 0.1% of a non-ionic detergent and 0.25% sodium carbon dissolved in water. Finally, the scoured specimens were rinsed in clear water and dried at room temperature. The treated cloth specimens and comparable size pieces of the same types of untreated woven fabrics were dyed in a dye containing 1% Victoria Green based on fabric weight using a fabric/bath ratio of 1:30. The bath temperature was raised from 27° C. to 95° C. in one hour, and dyeing was continued for one hour more at the latter temperature. After dyeing, all the specimens were scoured in a cleaning solution consisting of 0.1% non-ionic detergent and 0.5% sodium carbonate dissolved in water. Finally, the scoured specimens were rinsed and dried at room temperature.

All of the cloth swatches which had received the treatment with the organic phosphoric acid were colored a deep green and this color was level across the entire area of the swatches. In contrast, the cloth swatches which had not received the pretreatment with the organic phosphoric acid were found to have only a faint green tint. The dark green cloth specimens were subjected to further washing operations and to dry cleaning. It was found that these additional washing and cleaning operations did not appreciably effect the color of the cloth specimens.

*Example 3*

The operations of Example 2 were repeated using a treating solution containing 5 parts of octylphenyl acid phosphate dissolved in 95 parts of isopropanol. Similar results were obtained as reported in Example 2.

In yet another case, the procedure of Example 2 was repeated using a treating solution containing 5 parts of octadecyl acid phosphate dissolved in 95 parts of butanol. Again, substantially the same results as reported in Example 2 were observed with the cloth samples treated with the phosphoric acid being deeply green colored and being resistant to vigorous washing and dry-cleaning operations.

*Example 4*

Swatches of fabrics woven in plain weave from twisted yarn formed of polypropylene staple fibers were padded through the following isopropanol solutions:

(A) Isopropanol only
(B) 1% stearyl acid phosphate
(C) 2% stearyl acid phosphate
(D) 3% stearyl acid phosphate
(E) 4% stearyl acid phosphate
(F) 5% stearyl acid phosphate The padding was carried out to give about 100% pickup. The impregnated swatches were air dried for one hour at room temperature and were then heated for 10 minutes at 120° C. Then, they were all scoured with a cleaning solution containing 0.1% non-ionic detergent and 0.25% sodium carbonate dissolved in water. This was followed by three water rinses and an air drying. The swatches were then divided into five separate groups, each group being dyed with one of the following five different cationic dyes:

Victoria Green WB_____C.I. No. 42000
Basic Green _____C.I. No. 42040
Basic Red _____C.I. No. 42500
Basic Blue _____C. I. No. 51180
Calcozine Red_____C.I. No. 50240

Dye baths were used containing 1% of the dye based on the weight of the fabric and dyeing was conducted with a bath/fabric ratio of 30:1. The swatches were immersed in the respective dye bath at room temperature. The bath was then raised to 95° C. in one hour and dyeing was continued for one hour at 95° C., after which the swatches were removed and scoured in a cleaning solution. The resulting cloth samples were all dyed a level deep shade of the color of the dye used.

*Example 5*

Swatches of cloth woven of spun yarns of polypropylene fibers treated with 5% butyl acid phosphate as in Example 2, were scoured after heating for 5 minutes at 120° C. with the following scouring solutions:

(A) 0.1% non-ionic detergent and 1% copper acetate.
(B) 0.1% non-ionic detergent and 1% chromium acetate.

After the scouring, the swatches were dyed as in Example 2. The use of the metal salts in the scouring solution prior to dyeing produced improved leveling of the green dye.

In another case, samples scoured as in Example 2 were treated, after dyeing as in Example 2, with the following dye fixing agents:

(1) 3% stearatochromic chloride
(2) 3% polyamine-copper chloride adduct
(3) 3% zinc acetate These solutions were padded on the fabric and were followed by heating and drying at 120° C. for 5 minutes. Improved color value and light fastness were obtained by this after-treating procedure.

The invention is applicable to treatment of any articles made of solid polymers of olefins which, in the absence of the treatment, would not be receptive to dyestuffs, would have a propensity to acquire static electrical charges or would exhibit a lack of adhesion to resinous or other coatings which might be applied to the surface of the articles. Those polymers which are of particular importance with respect to the new treatments are the class of solid polymers that have an inherent viscosity of at least 0.8 and particularly those having an inherent viscosity between about 1.2 and about 10. The term "inherent viscosity" as used herein, means the viscosity of a solution of 0.2 grams of the polymer in 50 cc. of tetralin at 130° C. The invention finds special applicability to the treatment of solid polymers of olefins of 2 to 4 carbon atoms.

The various types of olefin polymers which may be treated in accordance with the invention are extensively described in the patent and technical literature, e.g., see "Encyclopedia of Chemical Technology," first supplement volume (1957), pp. 699–712 and second supplement volume (1960), pp. 661–672.

The new surface treatment procedures are applicable both to homopolymers of olefins and interpolymers of olefins with unsaturated hydrocarbons or other polymerizable materials resulting in solid polymers that are incapable of being satisfactorily dyed or coated because of the general inertness of the polymer. Obviously, the new procedures are of particular importance in the treatment of fiber-forming polymers such as fiber-forming polyethylene, polypropylene or other homopolymers or copolymers of 2–4 carbon atom α-olefins. The Textile Fiber Products Identification Act (Public Law 85–897), defines olefin fibers as "any manufactured fiber in which the fiber-forming substance is a long chain synthetic polymmer composed of at least 85% by weight of ethylene, propylene or other olefin units." The new treatments of this invention are contemplated for use in connection with all olefin fibers as so defined.

The organic phosphoric acid which constitutes the critical treating reagent may be used in undiluted form, but more satisfactorily it is dissolved in some suitable solvent which may include organic solvents such as hydrocarbon solvents, 1–8 carbon alkanols, dialkyl ethers, esters or the like. Various concentrations of the treating compound relative to the polyolefin may be employed. For example, in a padding method of applying the treating material from a solution, satisfactory results may be obtained by the deposition of about 0.1 to 10% by weight of treating agent base dupon the weight of the polyolefin. Deposition of between about 0.5 and 2% by weight of the treating compound has been found to be particularly useful. Where the operation is used in conjunction with the dyeing of the fiber or other article and lighter shades are desired, lower concentrations of the treating reagent are most economical to use. In general, the amount of treating reagent deposited is determined by the depth of shade of dyeing required or the degree of other change in surface characteristic required. The concentration of the solution of treating reagent will likewise depend upon the degree of modification desired and also the proportion of solution to be applied relative to the treated article solutions of the treating reagent and concentration of 0.1 to 100% are useable. Typically, concentrations of 1 to 5% produce satisfactory modification.

The treating solutions or other systems may include auxiliary agents such as heavy metal salts of organic acids, e.g., zinc, copper, nickel, cobalt and chromium salts of formic, acetic or other lower monocarboxylic acids. Also, they may include reagents to improve wash fastness, light fastness or other aspects of the final products. Such auxiliary agents would, for example, include synthetic resins, e.g., acrylic resins, amino-aldehyde resins, vinyl resins as well as wetting agents, leveling agents, emulsifiers, anti-oxidants, light-preserving agents or the like.

In order to effect a permanent association of the treating reagent with the polyolefin fibers or other articles, one should employ what may be referred to as a heating or aging step. This may be accomplished by heating the article in contact with the treating reagent to elevated temperatures, e.g., 100° to 250° C. for a period of about 1 to 120 minutes, preferably, 1 to 15 minutes, depending to some extent upon the degree of modification desired and other considerations. The higher the temperature, normally the less time is required for the predetermined degree of modification to be attained. Temperatures within the range of about 50° C. up to about 10° C. below the melting point of the polymer are useable. This aging phase of the treating methods may be effected by other ways than direct heating, e.g., flash diffusion of the treating agent under pressure or in the presence of superheated steam, steam distillation onto the surface to be treated, or boiling from suitable solvent solutions of the treating agents.

After the treatment of the polyolefin article with the treating reagent, it is normally desirable to remove surplus treating agent, i.e., any of the treating material which has not become permanently associated with the article. Such surplus agent removal, particularly in the case of fibers and textiles, is typically carried out by scouring the material to remove the loosely held treating reagent. For this purpose, conventional textile scouring techniques, dry-cleaning techniques or the like may be employed. Such cleaning procedures are generally followed by rinsing or drying, but the treatment procedure may be immediately followed by dyeing or printing steps without cleaning the surplus treating agent from the article surface. This is particularly true where surplus treating agents would have no detrimental effect upon dyeing, coloring, printing or subsequent coating compositions.

The dyeing of treated polyolefin fibers, fabrics, films or the like following the surface modification thereof may be carried out with cationic, amidic or comparable basic dyes in conventional manners common to the art of dyeing textile in machines such as the jig, beck, pad-steam range and pressure dyeing equipment. The conventional dyeing assistants, such as level agents, wetting agents, alkali salts, dye fixing agents, copper salts, chromium salts, etc., may be used in the process to produce uniform dyeing or to improve light-fastness, wash-fastness or the like as desired.

The treatment of the polyolefin materials may be carried out in any suitable stage. For example, in the case of continuous filaments, the treatment with the organic phosphoric acids may be accomplished immediately after spinning. In the case of yarns made of spun staple fibers, the treatment can be effected before the yarns are formed by operation upon the staple fiber or after formation of the yarn. Alternatively, fabrics can be woven from untreated monofilaments or spun yarn, after which they can be subjected to the new treatments and then dyed, colored, coated or subjected to other operations. This gives great flexibility to manufacturers and users of polyolefin fibers, films or other articles. For example, it enables the manufacturers of filaments and films to produce one commodity, rather than a whole series of modified materials, since, using the procedures of this invention, treatment of the polyolefin articles to make them receptive to dyeing or other coating operations can be conducted at the plant of the fabric manufacturer. Also, the new operations enables the textile processor or manufacturer to utilize the advantages of the new operations without making large investments in special processing equipment or in special training of personnel.

Modification of polyolefins by inclusion of the treating reagents of the invention into the polymer before formation of the ultimate preformed article is contemplated.

The treatment operations of the invention may be used for modification of olefin fibers when they constitute a portion of blended fabrics, e.g., when the fabrics are woven in admixture with polyester fibers, nylon fibers, silk fibers, cotton fibers or the like. On the other hand, it may be preferable to treat the olefin fibers prior to the weaving, knitting or other fabrication of the blended fabric, particularly where blended fabrics having multiple dye substantitive properties are to be processed.

For special applications, the treating reagent, may be applied simultaneously with the spinning, extrusion or other formation of the fibers, films, rods or the like. Again, use of about 0.1 to 5% of the treating agent relative to the total weight of the polyolefin material is satisfactory to produce adequate dye receptivity, decrease in static electric propensities or the like.

The new treatments as above described make possible the coloration of fibers, films, rods, sheets and other preformed articles of solid olefin polymers with conventional dyestuffs which normally do not adhere to or dye the polymer surfaces. Such surface modification of the olefin polymers also has utility in the use of printing inks, labeling and production of other decorative effects. In addition, the operations render the olefin polymer surfaces less electrostatic, more receptive to laminating adhesives, more receptive to pigments, paints and other coating compositions, more receptive to fluid-repellent agents and the like.

I claim:

1. A process of improving the dye receptivity of polypropylene fibers which comprises:
   (a) providing a solution containing about 5 parts of octadecyl acid phosphate in about 95 parts of isopropanol,
   (b) padding polypropylene fibers with said solution,
   (c) drying the padded fibers for about 15 minutes at about 90° C.,
   (d) heating the dried fibers at 130° C. for about five to 15 minutes, and
   (e) scouring the treated fibers to remove surplus octadecyl acid phosphate.

2. A process for improving the surface characteristics of a preformed article composed of solid olefin polymer which comprises:
   (a) applying to said article an organic phosphoric acid having the following formula:

wherein
   (1) R is a radical selected from the group consisting of alkyl, aryl, alkoxy and aryloxy containing 2 to 20 carbon atoms, and
   (2) R' is a radical selected from the group consisting of hydroxy, alkyl, aryl, alkyloxy containing 2 to 20 carbon atoms and aryloxy,
   (b) heating the article with the applied organic phosphoric acid to a temperature between about 10° C. below the melting point of said polyolefin and 100° C. to cause at least a part of said organic phosphoric acid to become permanently associated with said article,
   (c) removing from the resulting article those portions of the organic phosphoric acid which do not become permanently associated with said article as a result of said step (b), and (d) recovering the resulting modified polyolefin article having improved surface characteristics.

3. A process of improving the dye receptivity of olefin fibers which comprises:

(a) contacting the fibers with an organic phosphoric acid having the structure (I) as defined in claim 2, and (b) heating the fibers while in contact with said organic phosphoric acid to a temperature between about 10° C. below the meltnig point of said olefin fibers and 100° C.

4. A process of treating a preformed polyolefin article which comprises:

(a) contacting said article with an organic phosphoric acid, (b) heating the article while in contact with the organic phosphoric acid to a temperature between about 10° C. below the melting point of said polyolefin article and 100° C., and (c) freeing the treated article from surplus organic phosphoric acid.

5. A shaped article of solid olefin polymer having improved surface characteristics comprising an organic phosphoric acid permanently associated with its surface.

6. Olefin fibers possessing the ability of being dyed in deep shades with cationic dyes comprising an organic phosphoric acid associated with the surface thereof which will not be removed by scouring of the fibers.

7. A process of dyeing olefin fibers which are not receptive to dyes which comprises:

(a) contacting said olefin fibers with an organic phosphoric acid having the Formula I of claim 2, (b) heating the fibers while in contact with said organic phosphoric acid to a temperature between 10° C. below the melting point of said article and 100° C. to effect a permanent association of said acid with the fibers, (c) cleaning the fibers to remove therefrom organic phosphoric acid not permanently associated with the fibers, and (d) dyeing the fibers with a dye selected from the group consisting of cationic dyes and aminated dyes.

8. A process of treating a preformed article of solid olefin polymer to:

(a) improve its dye receptivity, (b) reduce its static electricity propensities, and (c) increase its adhesion to coatings which comprises applying to the surface of the article an organic phosphoric acid having the Formula I of claim 2 and heating the article with said applied organic phosphoric acid to a temperature between about 10° C. below the melting point of the article and 100° C.

9. Fibers composed essentially of a homopolymer of an α-olefin of two to four carbon atoms and containing on the surface portions only thereof an invisible layer of an organic phosphoric acid having the Formula I of claim 2, said fibers being receptive to dyes and being capable of being dyed in level, deep shades with conventional dyestuffs using conventional dyeing methods.

10. Olefin fibers formed of solid olefin polymer that is normally non-receptive to dyes, which fibers have permanently associated with their surface an ionic organic phosphorous compound having the Formula I of claim 2 in such small amount that the fibers have substantially the same appearance, hand and strength characteristics as such olefin fibers would have in the absence of said ionic organic phosphorous compound, said fibers being receptive to dyes and being capable of being dyed in level, deep shades with conventional dyestuffs using conventional dyeing methods.

11. A preformed article composed of solid olefin polymer having 2 to 20 carbon atom alkyl phosphoric acid on the surface thereof, said article not being changed in visual appearance by the presence of said alkyl phosphoric acid, the article possessing improved dye receptivity, reduced static electricity propensities and greater adhesion to resinous coatings than such article would possess in the absence of said alkyl phosphoric acid.

12. Fibers composed of solid polymer of a 2 to 4 carbon atom α-olefin capable of being dyed in deep shades with cationic textile dyes comprising between about 0.01 and 10% by weight of an organic phosphoric acid of the Formula I of claim 2.

13. A film composed of solid polymer of a 2 to 4 carbon atom α-olefin having low propensity to accumulate static electrical changes comprising between about 0.01 and 10% by weight of an organic phosphoric acid of the Formula I of claim 2.

14. A process for treating a film of polyolefin which comprises:

(a) contacting the film with an organic phosphoric acid of the Formula I of claim 2, (b) heating the film while in contact with the organic phosphoric acid to a temperature between about 100 and 200° C. or a period of about 5 to 100 minutes, and (c) removing organic phosphoric acid from the film which has not become permanently associated with the film as a result of step (b).

References Cited in the file of this patent

UNITED STATES PATENTS

| | | |
|---|---|---|
| 2,475,628 | McSweeney | July 12, 1949 |
| 2,631,997 | Stewart | Mar. 17, 1953 |
| 2,719,156 | Benneville et al. | Sept. 27, 1955 |
| 2,831,840 | Lindeboom | Apr. 22, 1958 |
| 2,932,550 | Walmsley | Apr. 12, 1960 |
| 2,980,964 | Dilke | Apr. 25, 1961 |
| 2,984,634 | Caldwell et al. | May 16, 1961 |
| 2,985,604 | Koehler et al. | May 23, 1961 |
| 3,006,947 | Lanham | Oct. 31, 1961 |
| 3,036,052 | Mier et al. | May 22, 1962 |
| 3,039,840 | Sawaya | June 19, 1962 |

FOREIGN PATENTS

| | | |
|---|---|---|
| 838,296 | Great Britain | June 22, 1960 |

OTHER REFERENCES

Ham: Industrial and Engineering Chemistry, vol. 46, No. 2, pp. 390–392.